(12) United States Patent
Muldoon

(10) Patent No.: US 7,954,903 B2
(45) Date of Patent: Jun. 7, 2011

(54) BARRIER MECHANISM

(76) Inventor: Gerald Muldoon, Dungannon (GB)

( * ) Notice: Subject to any disclaimer, the term of this patent is extended or adjusted under 35 U.S.C. 154(b) by 191 days.

(21) Appl. No.: 12/249,476

(22) Filed: Oct. 10, 2008

(65) Prior Publication Data
US 2009/0096242 A1    Apr. 16, 2009

(30) Foreign Application Priority Data

Oct. 15, 2007 (GB) .................................. 0720087.6

(51) Int. Cl.
*B60P 1/26* (2006.01)
(52) U.S. Cl. ................................. 298/23 MD
(58) Field of Classification Search ............. 298/23 MD, 298/23 R, 23 M, 17 R, 17 B, 1 B; 410/117, 410/121, 143, 153, 155, 156
See application file for complete search history.

(56) References Cited

U.S. PATENT DOCUMENTS

| 3,548,540 | A | * | 12/1970 | Cullings | 49/163 |
| 3,868,042 | A | * | 2/1975 | Bodenheimer | 220/1.6 |
| 4,054,226 | A | * | 10/1977 | Bjelland et al. | 220/1.6 |
| 5,518,287 | A | * | 5/1996 | Totani | 296/57.1 |
| 5,595,315 | A | * | 1/1997 | Podd et al. | 220/1.5 |
| 5,636,952 | A | * | 6/1997 | Richardson | 410/121 |
| 5,823,630 | A | * | 10/1998 | Graham | 298/23 S |

* cited by examiner

*Primary Examiner* — H Gutman
(74) *Attorney, Agent, or Firm* — Withrow & Terranova, P.L.L.C.

(57) ABSTRACT

A barrier mechanism for vehicles arranged to receive containers comprising dispensable content comprises a bracket arranged to be moveably mounted at a dispensing side of the vehicle and an activation device. The activation device is operable to move the bracket between a non-deployed state, to accommodate loading of the container onto the trailer, and a deployed state, for securing container content during dispensing of content at the barrier side of the vehicle.

7 Claims, 6 Drawing Sheets

BARRIER MECHANISM

This application claims priority to UK patent application number 0720087.6 filed Oct. 15, 2007, the disclosure of which is incorporated herein by reference in its entirety.

FIELD OF THE INVENTION

The present invention relates to a barrier mechanism for rear ends of trailers, and in particular, a barrier mechanism for rear ends of flat bed trailers.

BACKGROUND OF THE INVENTION

FIG. 1 illustrates a typical flat bed trailer 10. Such flat bed trailers 10 are arranged to receive a goods container 12, for example, a shipping container. Typically, these containers 12 are lowered down on to the flat bed of the trailer and then secured in place by four locking mechanisms 14, one at each corner of the container 12. Normally the trailer 10 has a tipping mechanism (not shown) to allow the container 12 to be tipped up so that its contents can be dispensed from its rear end. This type of trailer is commonly referred to as a tipping skeletal trailer.

However, many problems arise with such assemblies. Operators 19 often forget to engage all locking mechanisms, or fail to do so properly, in which case the containers 12 have been known to slide off the trailer 10, especially when in the tipping mode.

Very often the containers 12 will contain large quantities of a flowable material, e.g. sugar, contained in very large bags 16 inside the trailer. The containers 12 often have restraining elements 18 extending horizontally across their rear ends to prevent the bags 16 of flowable material falling out of the rear of the container 12 when in the tipping mode.

To dispense this type of flowable material, the trailers typically have a dispensing mechanism 17 which is either located permanently at the rear of the trailer 10 or can be deployed for use.

When it is desired to dispense the flowable load, the dispensing mechanism is deployed (if it isn't already permanently deployed) and the bags of flowable material are connected to the dispenser so that the contents, i.e. the flowable material, is dispensed out of the container 12 via the dispenser. During this process, the bags 16 are retained within the container via the restraining elements 18.

It has been known, however, for these restraining elements 18 to give way under the weight of the bags thus causing the bags to fall out of the rear of the trailer. As a result, this type of container/trailer assembly has serious health and safety issues.

It is an object of the present invention to provide an improved barrier mechanism for rear ends of trailers and thereby mitigate one or more of the disadvantages of the prior art.

SUMMARY OF THE INVENTION

According to the present invention, there is provided a barrier mechanism for vehicles arranged to receive containers comprising dispensable content, said mechanism comprising a bracket arranged to be moveably mounted at a dispensing side of said vehicle and an activation device, the activation device being operable to move said bracket between a non-deployed state, to accommodate loading of the container onto the trailer, and a deployed state, for securing container content during dispensing of content at the barrier side of the vehicle.

Preferably said bracket is substantially u-shaped comprising a first and second free end and said bracket is arranged to be moveably mounted at its free ends to said vehicle.

Preferably, said bracket is arranged to pivot about a fixed axis of said vehicle as it moves between the non-deployed and deployed states.

Preferably said bracket is disposed in close proximity to an end of said vehicle.

Preferably said bracket is substantially horizontally disposed at the rear of said vehicle when in said non-deployed state.

Preferably said bracket extends substantially vertically upwardly at the rear of said vehicle, adjacent to an end of the container when fitted, when in said deployed state.

Preferably, said activation device comprises an hydraulic ram.

Preferably, said barrier mechanism further comprises a ratchet and pawl mechanism for maintaining the bracket in the deployed state while said vehicle is in tipping mode.

BRIEF DESCRIPTION OF THE DRAWING FIGURES

Embodiments of the invention will now be described, by way of example, with reference to the accompanying drawings, in which.

DETAILED DESCRIPTION OF THE PREFERRED EMBODIMENTS

Figure 1:
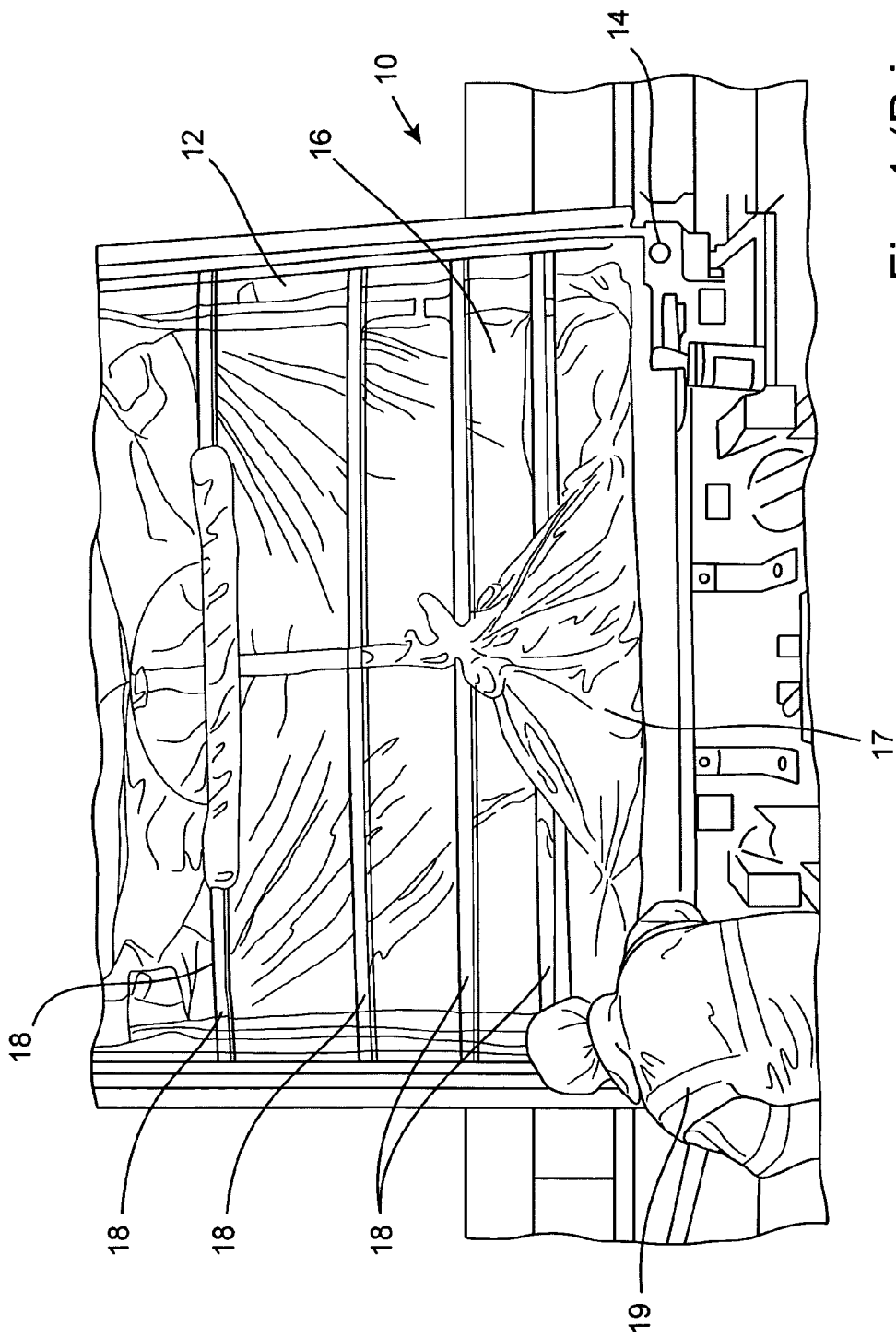
FIG. 1 illustrates a typical flat bed trailer/container assembly.
Figure 2:
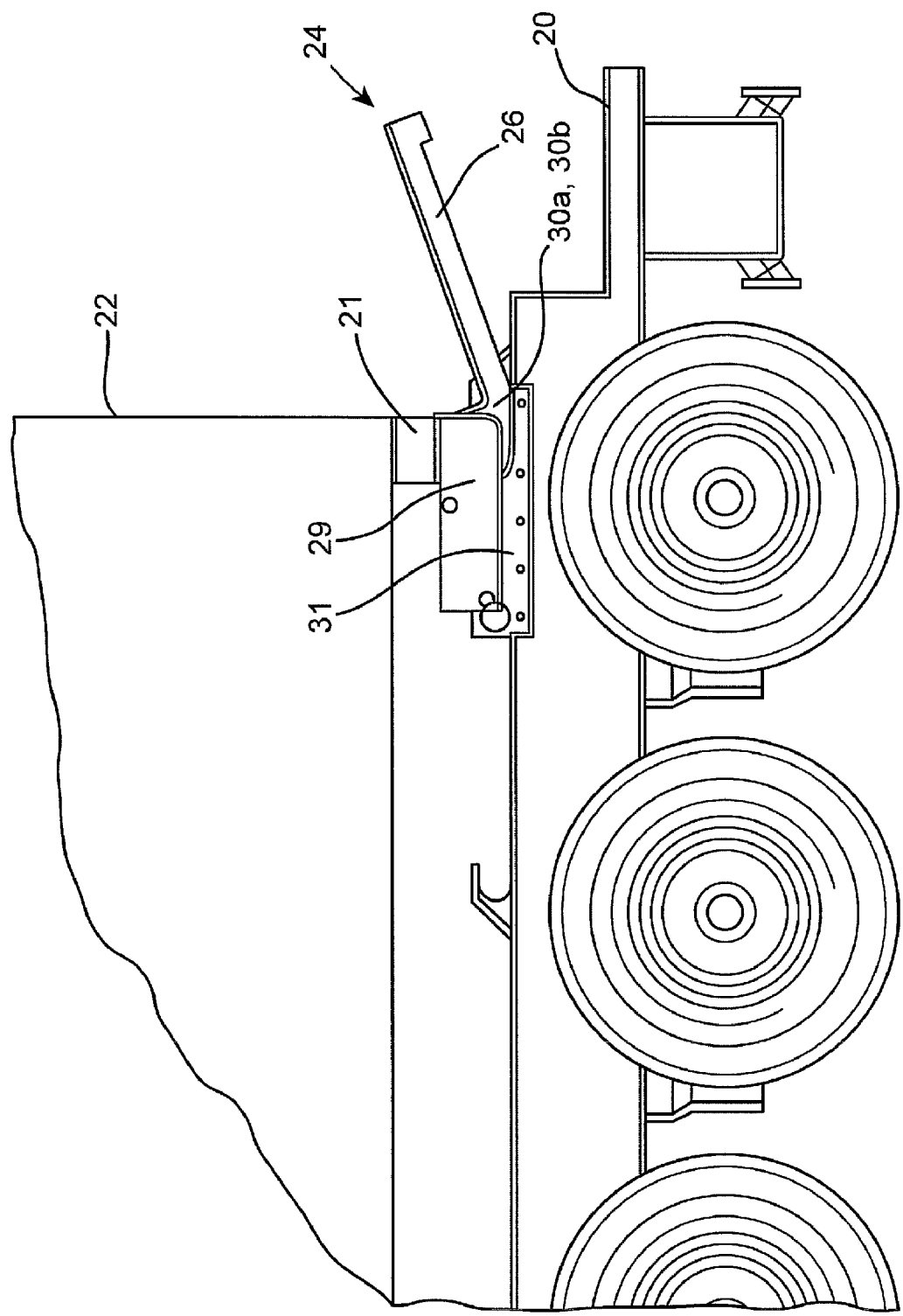
FIG. 2 illustrates a barrier mechanism according to a preferred embodiment of the invention in a non-deployed state on a rear end of a trailer.
Figure 3:
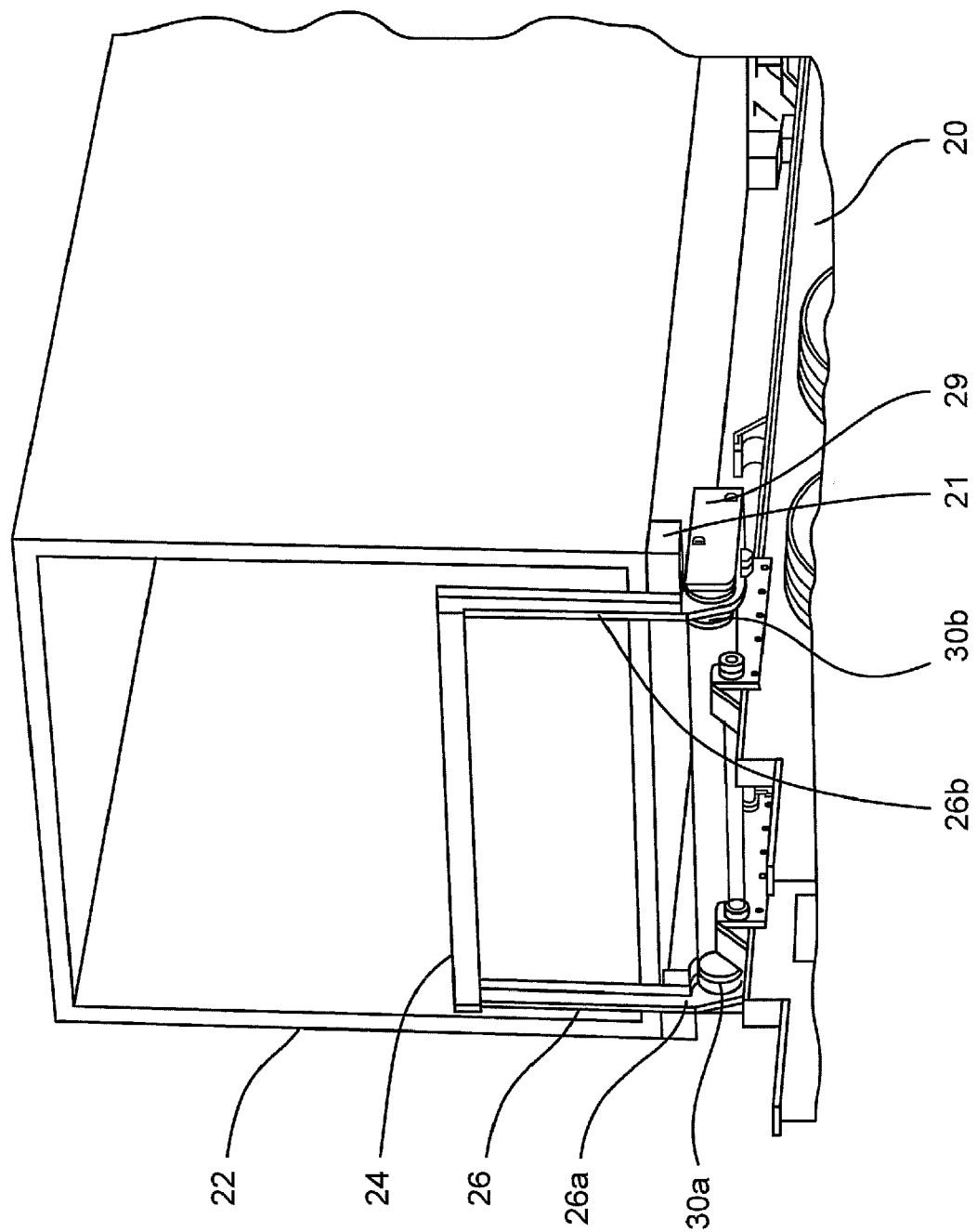
FIG. 3 illustrates the barrier mechanism of FIG. 2 in a deployed state.

Referring to FIGS. 2 and 3 of the accompanying drawings, there is provided a flat bed trailer 20 comprising a container 22. In the preferred embodiment, the container is secured to the trailer by means of twist locks, 21, one provided at each of the corners of the container 22. The container 22 is arranged to receive dispensable content, for example, a bag of flowable materials (not shown). In order to dispense the content of the container, the trailer assumes a tipping mode whereby a tipping section (not shown) of the trailer moves from a substantially horizontal position to an inclined position with respect to the flat bed trailer 20.

Figure 4:
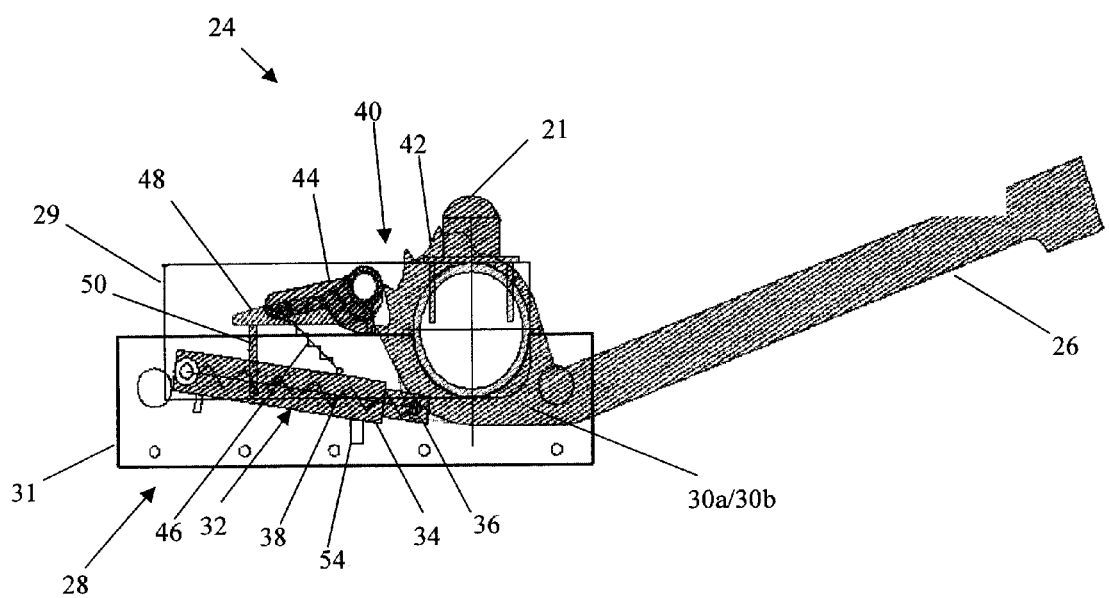
FIG. 4 illustrates a side view of the barrier mechanism of FIGS. 2 and 3 comprising a bracket and an activation device.
Figure 5:
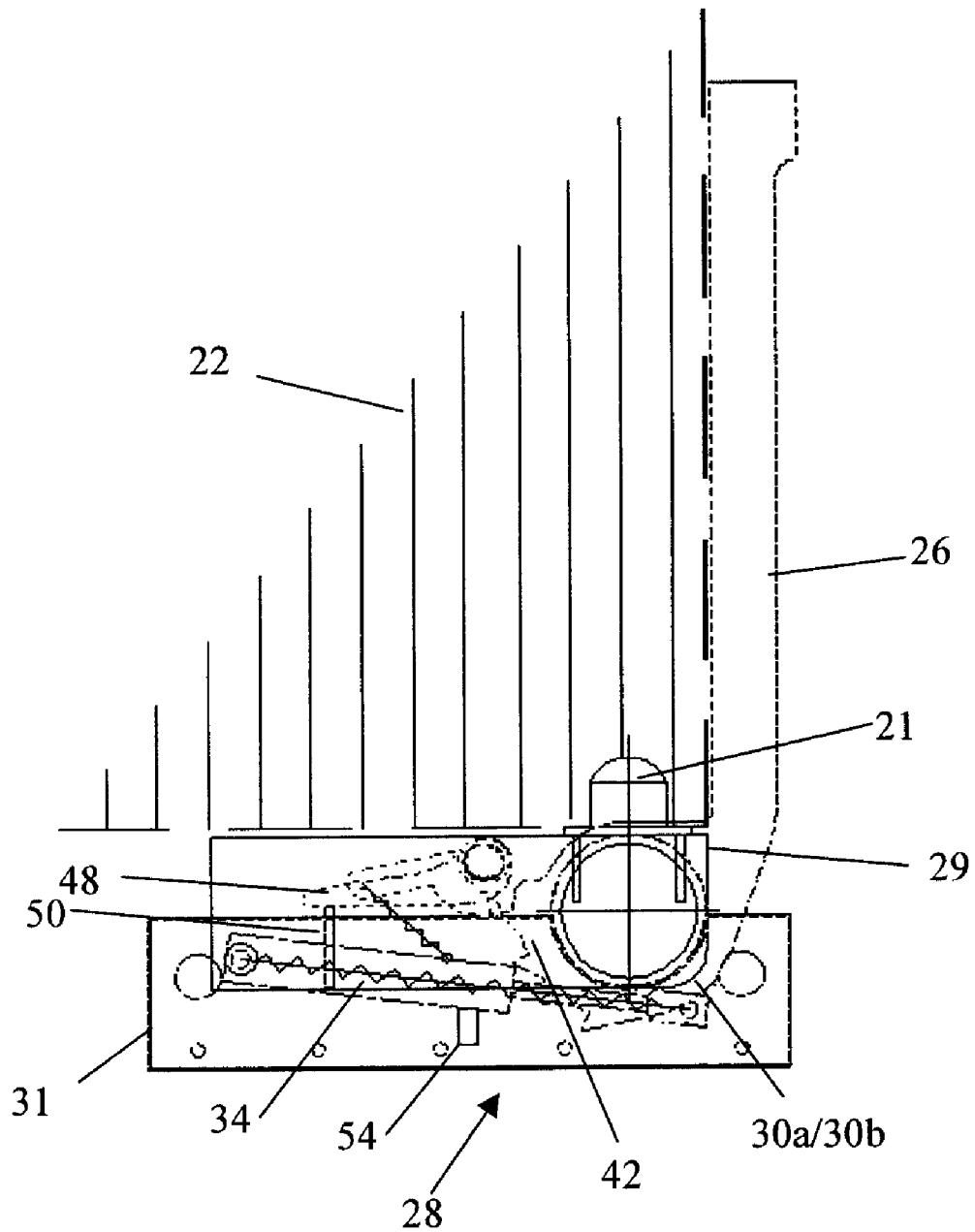
FIG. 5 illustrates a side view of the barrier mechanism of FIG. 4, in a deployed state.
Figure 6:
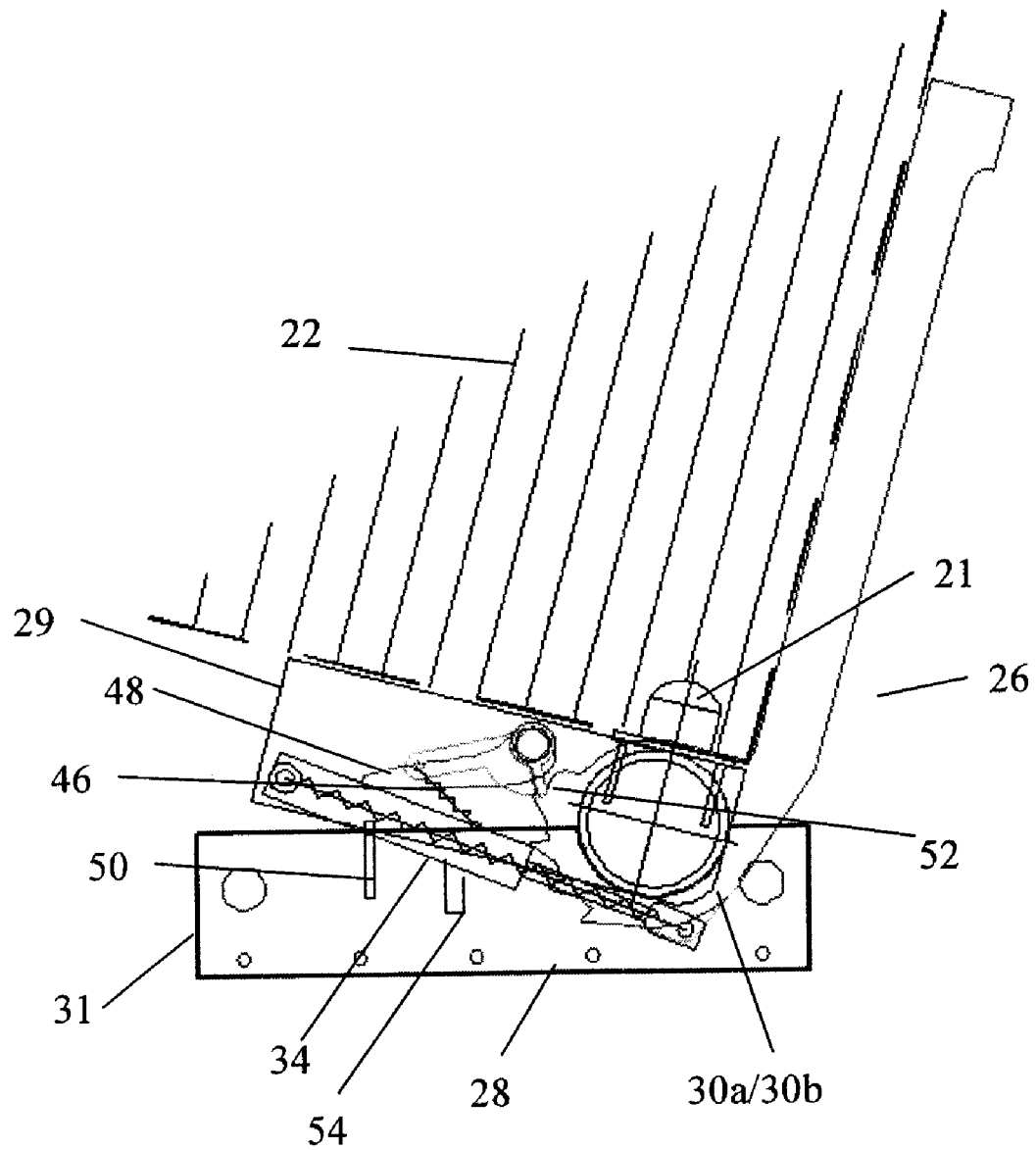
FIG. 6 illustrates a side view of the barrier mechanism of FIG. 5 during tipping of the trailer/container assembly.

The trailer 20 further comprises a barrier mechanism 24 disposed in close proximity to a rear end of the trailer for securing the bags within the container 22 during tipping mode. In the preferred embodiment, the barrier mechanism 24 comprises a generally U-shaped bracket 26 and an activation device 28, as illustrated in FIGS. 4, 5 and 6.

The bracket 26 is moveably mounted to the trailer at its free ends, 26a and 26b respectively. In the preferred embodiment, couplers 30a and 30b are provided at each free end 26a and 26b respectively, for coupling the bracket 26 to the trailer 20.

The activation device 28 is arranged to move the bracket 26 between a non-deployed state, as illustrated in FIG. 2, and a deployed state, as illustrated in FIG. 3. In the preferred embodiment, the bracket is arranged to pivot about a fixed axis of the trailer 20 as it moves between the non-deployed and deployed states.

In the non-deployed state, as illustrated in FIG. 2, the bracket 26 is substantially horizontally disposed at the rear of the trailer 20. In the deployed state, as illustrated in FIG. 3, the bracket 26 extends substantially vertically upwardly at the rear of the trailer 20, adjacent to the end of the container 22 when fitted.

Referring now to FIG. 4, in the preferred embodiment the activation device 28 is provided at least partially within a housing 29. The housing 29 and the coupler 30A/30B of the bracket 26 are disposed on a trolley plate 31 moveably mounted to the trailer 20 such that the barrier mechanism 24 can be moved along the length of the trailer 20 to accommodate different sizes of containers 22.

In the preferred embodiment, the activation device 28 comprises a single acting hydraulic ram 32. It will be appreciated however that the barrier mechanism 24 may comprise two activation devices 28, one provided at each of the free ends of the bracket 26.

The hydraulic ram 32 comprises a hydraulic cylinder 34 and a piston rod 36. The piston rod 36 is connected to the cylinder by means of a return spring 38. The piston rod 36 engages one of the couplers 30a/30b of the bracket 26 and is positioned for reciprocating movement along a generally longitudinal axis of the cylinder 34. When activated, the piston rod 36 extends and pushes outwardly against the coupler 30a/30b, thereby causing the bracket 26 to pivot from the non-deployed state to the deployed state. Similarly, when deactivated, the return spring 38 causes the piston rod 36 to retract within the cylinder 34, thereby causing the bracket 26 to pivot from the deployed state to the non-deployed state.

In an alternative embodiment, the single acting hydraulic ram 32 and spring 38 are replaced with a double acting hydraulic ram.

In the preferred embodiment, the barrier mechanism 24 further comprises a ratchet and pawl mechanism 40 for maintaining the barrier in the deployed state while the trailer is in tipping mode. However, it will be appreciated that the ratchet and pawl mechanism 40 may be replaced with any suitable mechanism for maintaining the bracket in the deployed state.

The ratchet and pawl mechanism 40 comprises a ratchet bar 42 connected to the coupler 30a/30b, and a pawl 44 connected to the hydraulic cylinder 34 by means of a pawl spring 46. The pawl 44 comprises a pawl arm 48 arranged to cooperate with a pawl release 50. In an inoperative state, the pawl arm 48 engages the pawl release 50 and in an operative state, the pawl arm 48 disengages from the pawl release 50, as is explained in more detail below. In the preferred embodiment, the ratchet bar 42 is integrally formed with the coupler 30a/30b.

When the bracket is in its non-deployed state, a container 22 comprising a bag of flowable content is lowered onto the tipping section of the trailer 20. To commence tipping of the container content, an operator activates the activation device 28 causing the piston rod 36 of the hydraulic ram 34 to extend and push outwardly against the coupler 30a/30b. The ratchet and pawl mechanism 40 engages step by step as the bracket 26 pivots from the non-deployed state to the deployed state, as is illustrated in FIG. 5. In the preferred embodiment, once the bracket 26 is in its deployed state, fluid is diverted from the hydraulic ram 32 via a diverter 54, to a tipping ram (not shown) of the trailer, to allow tipping to commence.

Referring now to FIG. 6, as the tipping section (not shown) and thus the container 22 begins to lift, the pawl arm 48 disengages from the pawl release 50, allowing the pawl spring 46 pull the pawl 44 toward a ratchet 52 of the ratchet bar 42, thereby maintaining the bracket 26 in the deployed state.

When the content of the container 22 has been dispensed, the tipping section (not shown) and thus the container 22, is lowered. As the tipping section approaches the horizontal, the pawl arm 48 engages the pawl release 50, causing the ratchet and pawl mechanism 40 to assume the inoperative state. The activation device can then be deactivated, allowing the return spring 38 to retract piston rod 36 within the cylinder 34, and thereby causing the bracket 26 to pivot from the deployed state to the non-deployed state.

The invention is not limited to the embodiment(s) described herein but can be amended or modified without departing from the scope of the present invention.

The invention claimed is:

1. A barrier mechanism for vehicles arranged to receive a container comprising dispensable content, said mechanism comprising:
   a bracket arranged to be moveably mounted at a dispensing side of said vehicle;
   a hydraulic ram comprising fluid;
   said hydraulic ram being operable to move said bracket between a non-deployed state, to accommodate loading of the container onto the vehicle, and a deployed state, for securing said content during dispensing of said content at a barrier side of the vehicle; and
   wherein once the bracket is in the deployed state, said fluid from the hydraulic ram is diverted to a tipping ram of the vehicle, to allow tipping of the container to commence.

2. A barrier mechanism as claimed in claim 1 wherein said bracket is substantially u-shaped comprising a first and second free end and said bracket is arranged to be moveably mounted at said first and second free end to said vehicle.

3. A barrier mechanism as claimed in claim 1 wherein said bracket is arranged to pivot about a fixed axis of said vehicle as said bracket moves between the non-deployed and deployed states.

4. A barrier mechanism as claimed in claim 1 wherein said bracket is disposed in close proximity to an end of said vehicle.

5. A barrier mechanism as claimed in claim 1 wherein said bracket is substantially horizontally disposed at the rear of said vehicle when in said non-deployed state.

6. A barrier mechanism as claimed in claim 1 wherein said bracket extends substantially vertically upwardly at the rear of said vehicle, adjacent to an end of the container when fitted, when in said deployed state.

7. A barrier mechanism as claimed in claim 1 wherein said barrier mechanism further comprises a ratchet and pawl mechanism for maintaining the bracket in the deployed state while said vehicle is in a tipping mode.

* * * * *